(12) United States Patent
Parkos et al.

(10) Patent No.: US 9,574,282 B2
(45) Date of Patent: Feb. 21, 2017

(54) ABRASIVE THERMAL COATING

(75) Inventors: Joseph Parkos, East Haddam, CT (US); Melvin Freling, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 1020 days.

(21) Appl. No.: 13/572,927

(22) Filed: Aug. 13, 2012

(65) Prior Publication Data

US 2014/0044527 A1 Feb. 13, 2014

(51) Int. Cl.

| | |
|---|---|
| C25D 15/00 | (2006.01) |
| F04D 29/02 | (2006.01) |
| F04D 29/32 | (2006.01) |
| F04D 29/54 | (2006.01) |
| F01D 5/28 | (2006.01) |
| F01D 11/12 | (2006.01) |
| C23C 4/02 | (2006.01) |
| C23C 4/18 | (2006.01) |
| C23C 28/00 | (2006.01) |

(52) U.S. Cl.
CPC .............. *C25D 15/00* (2013.01); *C23C 4/02* (2013.01); *C23C 4/11* (2016.01); *C23C 4/18* (2013.01); *C23C 28/321* (2013.01); *C23C 28/322* (2013.01); *C23C 28/324* (2013.01); *C23C 28/3215* (2013.01); *C23C 28/34* (2013.01); *C23C 28/345* (2013.01); *C23C 28/347* (2013.01); *F01D 5/286* (2013.01); *F01D 5/288* (2013.01); *F01D 11/122* (2013.01); *F04D 29/023* (2013.01); *F04D 29/324* (2013.01); *F04D 29/542* (2013.01); *F05D 2230/31* (2013.01); *F05D 2300/21* (2013.01); *F05D 2300/2112* (2013.01); *F05D 2300/2282* (2013.01); *F05D 2300/5024* (2013.01); *F05D 2300/6032* (2013.01); *F05D 2300/611* (2013.01); *Y02T 50/671* (2013.01); *Y10T 428/12618* (2015.01)

(58) Field of Classification Search
CPC ........................................................ F01D 5/288
See application file for complete search history.

(56) References Cited

U.S. PATENT DOCUMENTS

| | | | |
|---|---|---|---|
| 6,013,592 A * | 1/2000 | Merrill et al. | 501/80 |
| 8,186,946 B2 | 5/2012 | Parkos, Jr. et al. | |
| 2010/0081558 A1* | 4/2010 | Taylor | 501/135 |
| 2010/0266392 A1* | 10/2010 | Parkos et al. | 415/174.4 |
| 2010/0266409 A1* | 10/2010 | Chandra et al. | 416/95 |
| 2011/0159260 A1* | 6/2011 | Casu et al. | 428/215 |
| 2012/0099970 A1* | 4/2012 | Strock et al. | 415/173.4 |
| 2012/0141822 A1* | 6/2012 | Eichmann et al. | 428/623 |
| 2012/0159952 A1* | 6/2012 | Arikawa et al. | 60/722 |
| 2012/0189871 A1* | 7/2012 | Hecht | 428/697 |

* cited by examiner

Primary Examiner — Craig Kim
Assistant Examiner — Eldon Brockman
(74) Attorney, Agent, or Firm — Kinney & Lange, P.A.

(57) ABSTRACT

A protective coating for a surface exposed to hot gas flow comprises a thermal layer, a conducting layer and an abrasive layer. The thermal layer comprises alumina having a sufficient amount of impurities to lower the thermal layer thermal conductivity. The layer is formed from a powder having a thermal conductivity no more than 10 BTU in/hr ft$^2$° F., and overlies the surface. The conducting layer overlies the thermal layer. The abrasive layer comprises abrasive particles bonded in a metal matrix that is electroplated onto the conducting layer.

20 Claims, 4 Drawing Sheets

ABRASIVE THERMAL COATING

BACKGROUND

This invention relates generally to airfoils for gas turbine engines, and specifically to airfoil coatings. In particular, the invention concerns an abrasive thermal protective coating suitable for use on blade and vane airfoils in the turbine or compressor section of a gas turbine engine.

Gas turbine engines are configured around a core comprising a compressor, a combustor and a turbine, which are arranged in flow series with a forward (upstream) inlet and an aft (downstream) exhaust. The compressor compresses air from the inlet, which is mixed with fuel in the combustor and ignited to produce hot combustion gas. The combustion gas drives the turbine, and is exhausted downstream. Typically, compressed air is also utilized to cool downstream engine components, particularly turbine parts exposed to hot working fluid flow.

The turbine section may be coupled to the compressor via a common shaft, or using a series of coaxially nested shaft spools, which rotate independently. Each spool includes one or more compressor and turbine stages, which are formed by alternating rows of blades and vanes. The working surfaces of the blades and vanes are formed into airfoils, which are configured to compress air from the inlet (in the compressor), or to extract energy from combustion gas (in the turbine).

In ground-based industrial gas turbines, power output is typically provided in the form of rotational energy, which is transferred to a shaft and used to drive a mechanical load such as a generator. Weight is not as great a factor in ground-based applications, and industrial gas turbines can utilize complex spooling systems for increased efficiency. Ground-based turbines are also commonly configured for combined-cycle operations, in which additional energy is extracted from the partially-cooled exhaust gas stream, for example by driving a steam turbine.

Aviation applications include turbojet, turbofan and turboshaft engines. Most modern fixed-wing aircraft employ a two or three-spool turbofan configuration, as opposed to the older turbojet design, while rotary-wing aircraft (e.g., helicopters) are typically powered by turboshaft engines. Aviation engines also power accessory functions such as pneumatics, hydraulics and environmental control, for example via a bleed air system or electrical generator.

Turbofan engines use a forward fan or ducted propeller to generate thrust via bypass flow, which is directed around the main engine core. Most turbofans have a direct drive coupling the fan to the low-pressure turbine spool, but some advanced engines utilize a reduction gearbox for independent speed control, reducing noise and increasing engine efficiency. Subsonic aircraft typically employ high-bypass turbofans, in which most of the thrust is generated from bypass flow. Low-bypass turbofans tend to be louder and somewhat less fuel efficient, but provide greater specific thrust and are generally used for high-performance aircraft.

In gas turbine engine design, there is a constant need to balance the benefits of increased pressure and combustion temperature, which tend to improve engine performance, with wear and tear on the airfoil surfaces, which tend to decrease service life. In particular, there is a need for protective coating systems that reduce the thermal and erosive effects of the working fluid flow. There is a particular need, moreover, for protective coating systems that are adaptable to a variety of different engine configurations and airfoil designs, including rotor blade and stator vane airfoils exposed to high-temperature working fluid in the compressor or turbine section of a gas turbine engine.

SUMMARY

The present invention concerns a protective coating system for a surface exposed to hot gas flow, such as an airfoil surface, and a gas path component having the coating. The system comprises a thermal layer, a conducting layer and an abrasive layer. The thermal layer comprises alumina having sufficient impurities to provide a low thermal conductivity. The layer should be formed from a powder having a thermal conductivity no higher than 10 BTU in/hr ft$^{2\circ}$ F., and overlies the airfoil surface. The conducting layer overlies the thermal layer. The abrasive layer comprises an abrasive bonded in a metal matrix, which is electroplated onto the conducting layer.

DETAILED DESCRIPTION

Figure 1:
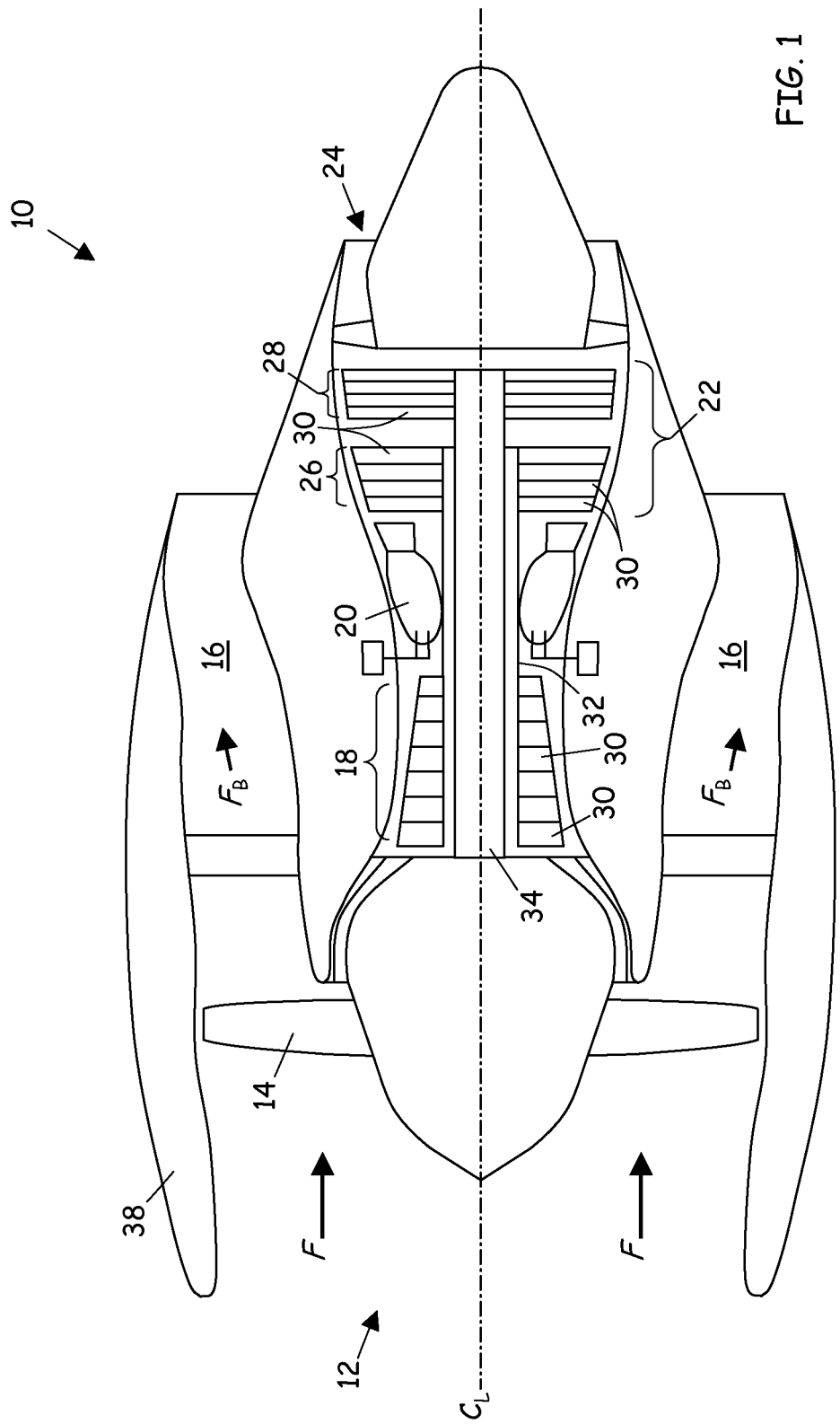
FIG. 1 is a cross-sectional view of a gas turbine engine, in a turbofan configuration.

FIG. 1 is a cross-sectional view of turbine engine 10, in a turbofan embodiment. In this embodiment, turbine engine 10 comprises inlet 12, fan 14, bypass duct 16, compressor 18, combustor(s) 20, turbine 22 and exhaust nozzle 24. Turbine 22 comprises high-pressure (HPT) section 26 and low-pressure (LPT) section 28. Compressor 18 and turbine sections 26 and 28 each have surfaces exposed to hot gas flow, including the surfaces of alternating blades and vanes 30, some of which surfaces are provided with an abrasive thermal protective coating as described below.

HPT section 26 of turbine engine 10 is coupled to compressor 18 via HPT shaft 32. LPT section 28 is coupled to fan 14 via LPT shaft 34. Fan 14 is mounted to a fan disk or other rotating member attached to LPT shaft 34, upstream of compressor 18 and within the forward region of engine cowling 38. LPT shaft is 34 is coaxially mounted within HPT shaft 32, about turbine axis (centerline) $C_L$, allowing the HPT and LPT spools to rotate independently.

In operation of turbine engine 10, airflow F enters via inlet 12. Bypass flow $F_B$ passes through bypass duct 16, downstream of fan 14, generating thrust. The remainder of inlet flow F passes through the core, including compressor 18, combustor(s) 20 and turbine 22.

Compressor 18 compresses air for combustor(s) 20, where it is mixed with fuel and ignited to produce hot combustion gas. In some embodiments, compressed air is also used to power various accessory systems, for example via a bleed air system as described above.

Hot combustion gas exits combustor(s) 20 to enter HPT section 26 of turbine 22, driving HPT shaft 32 and compressor 18. Partially expanded combustion gas transitions from HPT section 26 to LPT section 28, which drives fan 14 via LPT shaft 34. Exhaust gas exits turbine engine 10 via nozzle 24.

Although FIG. 1 illustrates a particular turbofan embodiment of turbine engine 10, this example is merely illustrative. In other embodiments the number of spools varies, and turbine engine 10 is configured as any of a low-bypass turbofan, a high-bypass turbofan, a turbojet engine, a turboshaft engine, an industrial gas turbine, or as a specialized turbine engine such as an auxiliary power unit (APU). Turbine engine 10 also utilizes a variety of working fluids including air, mixed combustion products and steam.

Figure 2A:
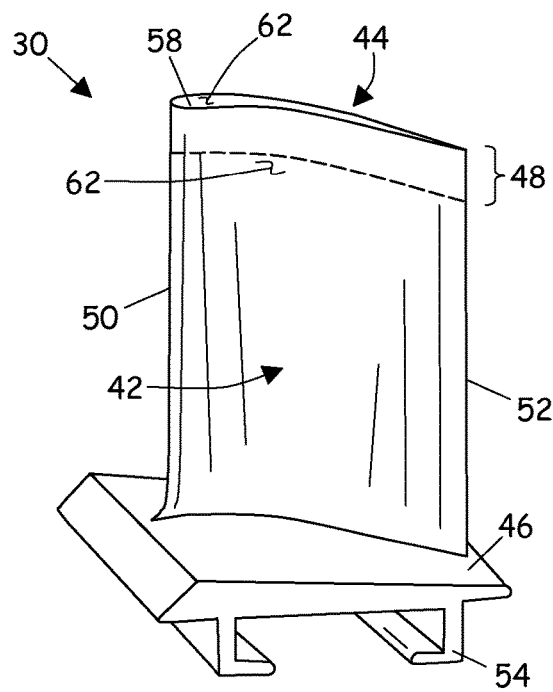
FIG. 2A is a perspective view of a vane airfoil for a gas turbine engine, in an unshrouded embodiment.
Figure 2B:
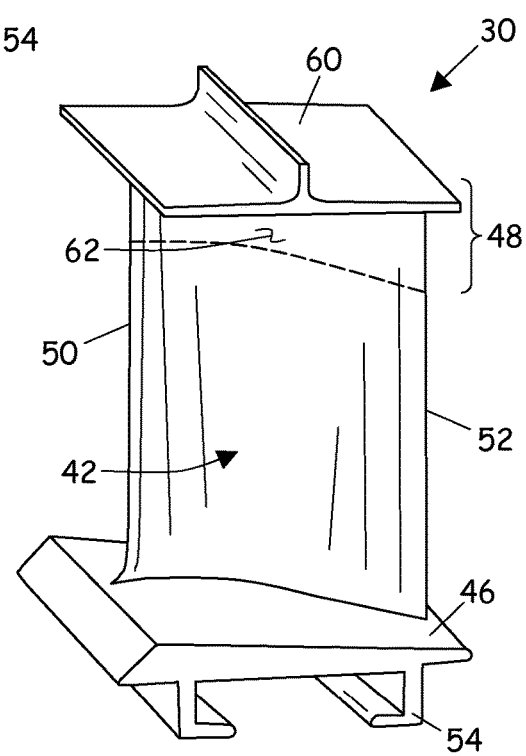
FIG. 2B is an alternate perspective view of the vane airfoil in FIG. 2A, in a shrouded embodiment.

FIGS. 2A and 2B are perspective views of components 30 with protective coating system 62, for use along the gas path of a turbine engine. In particular, protective coating system 62 is suitable for use on surfaces of components 30 subject to wear and tear from working fluid flow, including, but not limited to, airfoil surfaces and other gas path surfaces in compressor 18, HPT section 26 and LPT section 28 of turbine engine 10, as described above with respect to FIG. 1.

As shown in FIGS. 2A and 2B, components 30 are configured as airfoils, in unshrouded (FIG. 2A) and shrouded (FIG. 2B) embodiments, respectively. Each airfoil 30 comprises first surface 42 (front) and second surface 44 (back). Airfoil surfaces 42 and 44 are formed of a substrate material that extends from platform 46 to tip region 48, and between leading edge 50 and trailing edge 52. Some airfoils 30 also comprise internal or external structures for impingement cooling, film cooling or other cooling fluid flow.

In vane embodiments, airfoil 30 is mounted to a stationary (i.e. non-rotating) engine structure such as a compressor housing or a turbine case, which forms a flow boundary for working fluid. In one configuration, for example, platform 46 is mounted to an outer flow boundary, so that airfoil 30 is cantilevered inward and tip (or distal) region 48 is a radially inner portion of first and second surfaces 42 and 44. In these embodiments, the outer flow boundary is typically formed by a stationary compressor housing or turbine case, and the inner flow boundary is formed by a spool component such as a hub or rotor, which rotates past airfoil 30 in close proximity to unshrouded airfoil tip 58.

In the shrouded vane embodiment of FIG. 2B, airfoil 30 is supported at both ends. In this configuration, the radial orientation of tip region 48 depends upon mounting direction. In one embodiment, for example, platform 46 is attached at a radially inner flow margin and second platform 60 forms a shroud, such that tip region 48 is a radially outer region. Alternatively, the attachment is reversed and tip region 48 is directed radially inward.

Protective coating 62 forms an abrasive and thermally resistant coating over portions of airfoil 30, particularly in coated tip region 48. In some embodiments, for example, protective coating 62 is applied to airfoil 30 along tip surface 58, or along tip surface 58 and immediately adjacent portions of first and second surfaces 42 and 44. In these embodiments, protective coating 62 is sometimes applied to a bonding region extending along part of the span of first and second surfaces 42 and 44, in order to provide additional surface area for bonding and adhesion between protective coating 62 and airfoil 30. Typically, however, protective coating 62 does not extend along the major span of airfoil 30, in order to reduce losses from flow along abrasive coated surfaces.

Tip region 48 thus sometimes includes the distal portions of pressure surface 42, suction surface 44, leading edge 50 and trailing edge 52. In the unshrouded stator vane configuration of FIG. 2A, for example, airfoil 30 has a single platform 46 with hooks 54 or other means of mechanical attachment, and coated tip region 48 extends from first and second surfaces 42 and 44 to cover the surface of airfoil tip 58 (see also FIG. 3). In shrouded embodiment of FIG. 2B, on the other hand, coated tip region 48 extends to shroud (or second platform) 60. In these embodiments, protective coating 62 is sometimes applied to portions of shroud 60 or other inner or outer flow boundary surfaces, to sealing features such as a squealer tip or knife seal, or to a combination thereof.

Working fluid flows over airfoil 30 from leading edge 50 toward trailing edge 52, such that first surface 42 is a pressure surface (that is, a relatively higher pressure surface) and second surface 44 is a suction surface (a relatively lower pressure surface). The particular function of airfoils surfaces 42 and 44 varies, however, depending on embodiment. In blade airfoils, for example, first surface 42 and second surface 44 are typically shaped either to perform work by compression, or to extract rotational energy in a turbine. In vane embodiments, airfoil surfaces 41 and 42 are shaped to direct or turn the working fluid flow, for example in a turbine vane ring or nozzle.

Combustion gas and other hot working fluids cause a variety of wear effects on airfoils 30, including thermal stress, erosion and corrosion. In the unshrouded (cantilevered) embodiment of FIG. 2A, moreover, precise clearance is required between airfoil tip 58 and adjacent rotating parts, in order to form a seal with the compressor rotor or turbine shaft. Contact occurs when clearance is lost due to vibration, thermal expansion or mechanical deformation, resulting in the abrasion of airfoil tip 58 in coated region 48.

Some abrasive/abradable seal systems sacrifice stationary components in favor of rotating components, while other systems sacrifice rotating components in favor of stationary components. In either case, abrasion rate affects service lifetime. Abrasion also increases the rates of spallation, separation, peeling, transfer and other coating loss mechanisms, and reduces clearance control.

Protective coating system 62 addresses these concerns by providing a balance of thermal, abrasive and bonding properties. In particular, coating 62 provides abrasive and thermally resistant layers that protect airfoil 30 from thermal damage while maintaining tip clearance, increasing service life and improving engine performance. These advantages are also beneficial for rotating blade embodiments of airfoil 30, as described immediately below.

Figure 3:
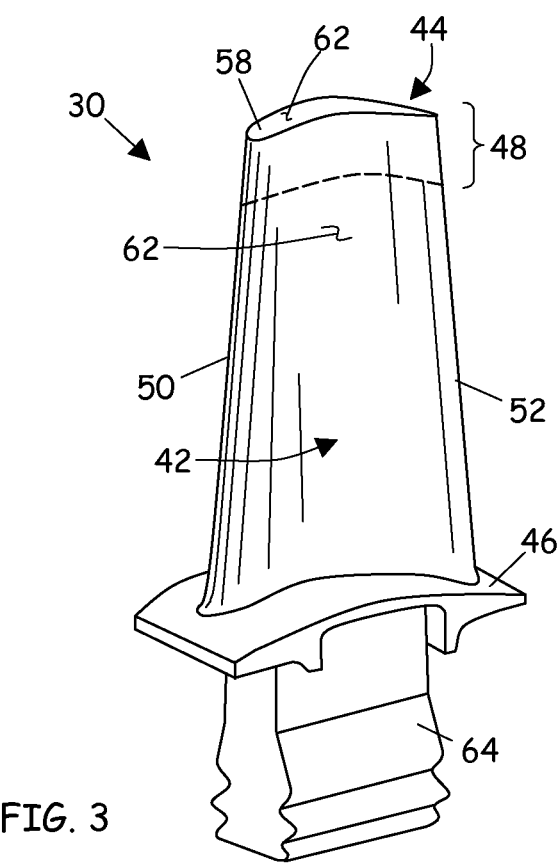
FIG. 3 is a perspective view of a rotor blade airfoil for a gas turbine engine.

FIG. 3 is a perspective view of airfoil 30 for turbine engine 10 of FIG. 1, in a rotor blade embodiment. Airfoil 30 comprises pressure surface 42 (front), suction surface 44 (back) and platform 46. In blade embodiments, platform 46 typically comprises root section 64 for attaching airfoil 30 to a rotating compressor or turbine component such as a rotor, hub or spool.

In the unshrouded embodiment of FIG. 3, airfoil surfaces 42 and 44 extend from platform 46 to tip region 48, and root section 64 of platform 46 is configured to securely retain airfoil 30 when subject to centripetal loading at high rotational speeds. In this embodiment, airfoil tip 58 is positioned to maintain clearance between airfoil 30 and an outer flow boundary such as a compressor housing or turbine case, for example via a knife edge seal or squealer tip sealing structure. In shrouded embodiments, coated tip region 48 extends to a second platform or shroud, as shown in FIG. 2B, above.

As in the stator vane embodiments described above, the surfaces of rotor blade airfoils 30 are exposed to wear in the hot working fluid flow, and unshrouded airfoil tips 58 are subject to similar clearance requirements. Abrasive/thermal barrier coating 62 thus provides blade airfoils with additional protection on their tips from thermal and abrasive effects, including erosion, corrosion, spallation, separation, peeling and abrasive transfer. This further improves service life, clearance control, and engine performance, while reducing maintenance costs and limiting engine downtime.

Figure 4A:
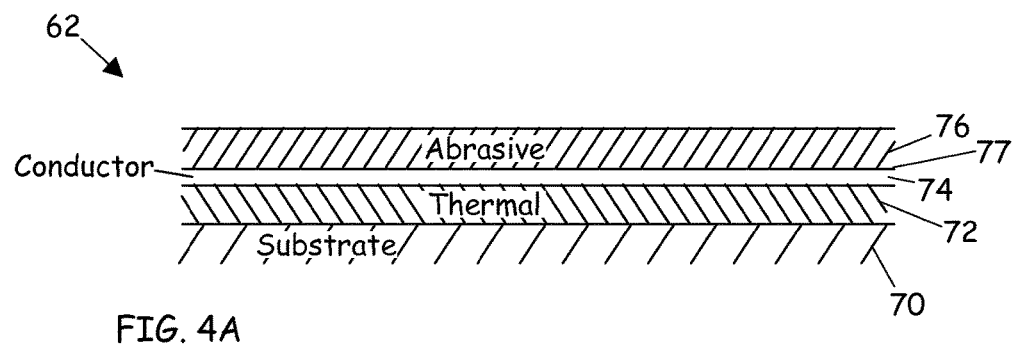
FIG. 4A is a cross-sectional view of an abrasive/thermal barrier coating system for an airfoil.
Figure 4B:
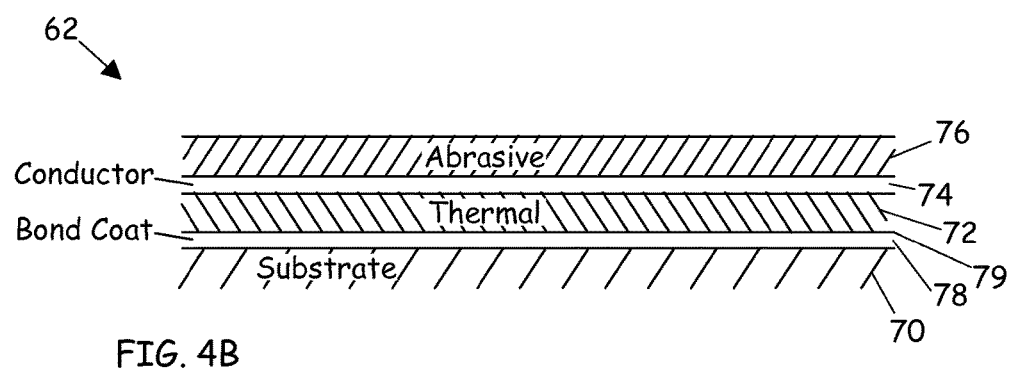
FIG. 4B is an alternate cross-sectional view of the abrasive/thermal barrier coating system in FIG. 4A, in an embodiment having a bond coat.

FIGS. 4A and 4B are cross-sectional views of abrasive/thermal barrier coating system 62. Coating system 62 comprises thermal layer 72, conducting layer 74 and abrasive layer 76. In the embodiment of FIG. 4A, coating system 62 is applied directly to airfoil substrate (airfoil surface) 70, and includes metal interface layer 77. In the embodiment of FIG. 4B, coating system 62 is applied to bond coat 78, which overlies substrate 70 and comprises oxide layer 79.

Substrate 70 defines one or more surfaces of an airfoil. The surfaces include, but are not limited to, pressure surfaces, suction surfaces, leading edge surfaces, trailing edge surfaces, unshrouded airfoil tip surfaces, and platform or shroud surfaces. The airfoil itself is configurable as either a stator vane or a rotor blade, and for operation in either a compressor or turbine apparatus, for example in the compressor or turbine section of a turbojet, turbofan or turboshaft engine, or in an industrial gas turbine.

Protective coating 62 covers substrate 70 in regions exposed to abrasion, hot working fluid flow, or both. The region of coverage includes, but is not limited to, unshrouded blade tip surfaces and portions of the adjacent pressure, suction, leading edge and trailing edge surfaces, for example a bonding or adhesion region adjacent the airfoil tip (see, e.g., FIGS. 2A, 3). In other embodiments, depending upon configuration and orientation, the region of coverage includes portions of a shroud, platform, squealer tip or knife seal system.

Substrate 70 is formed of a strong, durable, fatigue-resistant and thermally stable material. In one particular embodiment, substrate 70 is formed of a heat-resistant superalloy, such as a nickel-based superalloy. In other embodiments, substrate 70 is formed of another material including, but not limited to, cobalt, iron, titanium, and nickel-based alloys and superalloys.

Thermal layer 72 comprises a thermal barrier coating (TBC) formed from alumina having a sufficient amount of impurities to lower its thermal conductivity. The layer should be formed from a powder having a thermal conductivity no higher than 10 BTU in/hr ft$^{2\circ}$ F. Essentially pure alumina has a thermal conductivity of 25 to 30 BTU in/hr ft$^{2\circ}$ F. The impurity or impurities may be any material that is found in alumina in its less than pure state that lowers the thermal conductivity as noted above. Titanium dioxide is a common impurity in alumina and may be present in an amount ranging from 3% or 4% by weight titanium dioxide up to even as much as 40%, though higher amounts are not necessary to reduce the thermal conductivity to no more than 10 BTU in/hr ft$^{2\circ}$ F. Other impurities that are effective in reducing the thermal conductivity of alumina are iron oxide, silicon dioxide, magnesium oxide and calcium oxide, and, of course, mixtures of two or more of these impurities. In some applications where thermal conductivity of the thermal barrier coating is required to be lower, impurities in the alumina should lower the thermal conductivity to 6 BTU in/hr ft$^{2\circ}$ F. or less. The advantage of using alumina having a low thermal conductivity is that the effectiveness of thermal layer 72 is uniform and complete, and has a low cost since impurities do not need to be removed. Layer 72 of alumina as described is less expensive as other thermal layers, such as that shown in commonly owned U.S. Pat. No. 8,186,946, which discloses zirconia that has been stabilized.

Conducting layer 74 comprises an electrically conducting material such as a metal or metal alloy with resistance to oxidation and thermal stress at high temperatures. Depending upon operating range, suitable materials for conducting layer 74 include aluminum, iron, nickel, cobalt, chromium, silver and alloys thereof. In some embodiments, conducting layer 74 is flash coated in a thin layer over thermal layer 72. Alternatively, conducting layer 74 is formed of a conducting carbon-based material such as graphite or a conducting paint such as silver paint. In these embodiments, conducting layer 74 is typically applied in a solvent-based colloidal or paint form, and the conducting layer structure is defined by a corresponding coating process such as dip coating, spray coating or vacuum infiltration.

Abrasive layer 76 comprises a hard or abrasive material formed in a matrix, for example two-phase system comprising a non-abrasive host phase and an abrasive included phase. In one particular embodiment, abrasive layer 76 is formed of cubic boron nitride (CBN) particles in a nickel matrix. In other embodiments, abrasive layer 76 comprises abrasive particles or materials such as silicon carbide or alumina, or other forms of boron nitride (BN), and the matrix (or host phase) takes a number of forms, including iron, nickel and cobalt-based metals and metal alloys. Depending upon composition, abrasive layer 76 is sometimes thermally conducting and electrically insulating, sometimes both thermally and electrically conducting, and sometimes neither.

In some embodiments, abrasive layer 76 comprises interface layer 77. Interface 77 is formed substantially of the metal matrix or host phase, without abrasive inclusions, in order to improve bonding to conducting layer 74, or to modify the electrical conductivity or thermal properties of protective coating system 62. Alternatively, abrasive layer 76 is formed with a substantially uniform composition, in which abrasive particles are distributed throughout the thickness of abrasive layer 76.

Bond coat 78 typically comprises a metal such as aluminum (Al) or nickel-aluminum (Ni—Al) or alloys thereof. In some embodiments, bond coat 78 comprises an MCrAlY-type alloy of a metal (M) such as iron, nickel or cobalt, with chromium (Cr), aluminum (Al) and yttrium (Y). In further embodiments, bond coat 78 includes additional elements such as silicon (Si), hafnium (Hf), tantalum (Ta), or rhenium (Re). Typically, bond coat 78 also comprises aluminide or metal oxide coating 79, for example an aluminum oxide (Al2O3) or aluminide coating, or a diffusion aluminide coating comprising one or more noble metals such as ruthenium (Ru), rhodium (Rh), palladium (Pd), iridium (Ir), platinum (Pt) or gold (Au).

Thermal layer 72 is typically applied over airfoil substrate 70 by thermal spray techniques. In some embodiments, thermal layer 72 is applied directly onto substrate 70, as shown in FIG. 4A, and in other embodiments thermal layer 72 is applied to an intermediate layer such as bond coat 78 or oxide coating 79, as shown in FIG. 4B. Bond coat 78 provides a bonding or attachment interface between airfoil substrate 70 and abrasive/thermal barrier coating 62, and typically provides additional thermal, mechanical or chemical protection as well.

Conducting layer 74 is applied over thermal layer 72. Metal conducting layers are typically flash coated, while graphite conducting layers are typically applied by a dip, spray or vacuum process.

Abrasive layer 76 is typically electroplated onto conducting layer 74, for example by electroplating a metal/CBN material onto a metal or carbon-based conducting layer 74. In these embodiments, the structure of abrasive layer 76 is defined by electrodeposition of individual electroplate particles (e.g., nickel/CBN) onto the base (conducting layer 74 or interface 77). This contrasts, for example, with spray coating techniques, in which droplets of the coating material are bonded as a unit, and in which the bonds are contact bonds rather than electrochemical bonds formed by electrodeposition of individual particles.

As described above, protective coating system 62 provides a balance of thermal and abrasive properties for improving flow efficiency and increasing airfoil service life. In particular, protective coating 62 provides thermal protection from the hot working fluid flow, and reduces erosion, corrosion, spallation and other loss effects. In unshrouded airfoil embodiments, protective coating system 62 also provides one component of an abradable/abrasive seal and clearance system, maintaining rotational balance and precision clearance between rotating and non-rotating flow components by reducing abrasive losses and abrasive transfer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A protective coating system for a heat-resistant metal alloy surface exposed to hot gas flow, the metal alloy being selected from the group consisting of cobalt, iron, and nickel-based alloys and superalloys, the system comprising:
   a thermal layer overlying the metal alloy surface, the thermal layer comprising thermal sprayed alumina having a sufficient amount of impurities to lower its thermal conductivity;
   a conducting layer overlying the thermal layer; and
   an abrasive layer overlying the conducting layer, the abrasive layer comprising abrasive particles bonded in a metal matrix electroplated onto the thermal layer.

2. The system of claim 1, wherein the abrasive layer comprises an interface layer formed by electroplating the metal matrix onto the conducting layer.

3. The system of claim 2, wherein the abrasive particles are bonded in the metal matrix by electrodeposition.

4. The system of claim 3, wherein the abrasive particles comprise boron nitride and the metal matrix comprises nickel.

5. The system of claim 1, further comprising a bond coat overlying the surface of the airfoil surface and underlying the thermal layer.

6. The system of claim 5, wherein the thermal layer is alumina formed having a sufficient amount of impurities selected from the group consisting of titanium dioxide, iron oxide, silicon dioxide, magnesium oxide, calcium oxide, and mixtures of two or more of these impurities to lower the thermal layer thermal conductivity from a powder having a thermal conductivity no more than 10 BTU in/hr ft$^{2o}$ F.

7. The system of claim 5, wherein the conducting layer comprises a metal.

8. The system of claim 5, wherein the conducting layer comprises carbon.

9. The system of claim 1, wherein the metal alloy surface comprises an airfoil surface.

10. The system of claim 9, wherein the airfoil surface comprises an unshrouded tip surface.

11. The system of claim 9, wherein the airfoil surface comprises an abrasive seal.

12. A gas path component comprising:
   a heat-resistant metal alloy substrate defining a surface exposed to hot gas flow, the metal alloy being selected from the group consisting of cobalt, iron, and nickel-based alloys and superalloys; and
   a protective coating on the surface, the protective coating comprising:
      a thermal barrier comprising thermal sprayed alumina having a sufficient amount of impurities to lower its thermal conductivity overlying the substrate;
      a conducting layer overlying the thermal barrier; and
      an abrasive layer comprising abrasive particles and a metal matrix bonded to the conducting layer.

13. The gas path component of claim 12, wherein the thermal layer is alumina having a sufficient amount of impurities selected from the group consisting of titanium dioxide, iron oxide, silicon dioxide, magnesium oxide, calcium oxide, and mixtures of two or more of these impurities to lower the thermal layer thermal conductivity from a powder having a thermal conductivity no more than 10 BTU in/hr ft$^{2o}$ F.

14. The gas path component of claim 13, further comprising a bond coat between the metal alloy substrate and the thermal layer.

15. The gas path component of claim 14, wherein the abrasive layer comprises an interface formed of the metal matrix electroplated onto the conducting layer, and the abrasive particles bonded into the metal matrix by electrodeposition.

16. The gas path component of claim 15, wherein the abrasive particles comprise cubic boron nitride.

17. The airfoil of claim 16, wherein the surface comprises an airfoil tip.

18. A method for protecting a heat-resistant metal alloy surface exposed to hot gas flow, the metal alloy being selected from the group consisting of cobalt, iron, and nickel-based alloys and superalloys, the method comprising:
   thermal spraying a layer of alumina having a sufficient amount of impurities to lower the thermal layer thermal conductivity from a powder having a thermal conductivity no more than 10 BTU in/hr ft$^{2o}$ F. over the metal alloy surface;
   applying a layer of conducting material over the layer of alumina; and
   electroplating an abrasive layer onto the layer of conducting material, the abrasive layer comprising a metal matrix and abrasive particles.

19. The method of claim 18, wherein electroplating an abrasive layer comprises electroplating a layer of the metal onto the layer of conducting material to form a matrix, and bonding individual abrasive boron nitride particles into the matrix by electrodeposition.

20. The method of claim 18, further comprising applying a bond coat to the metal alloy surface, such that thermal spraying the layer of over the surface comprises thermal spraying the layer of alumina having a sufficient amount of impurities selected from the group consisting of titanium dioxide, iron oxide, silicon dioxide, magnesium oxide, calcium oxide, and mixtures of two or more of these impurities to lower the thermal layer thermal conductivity from a powder having a thermal conductivity no more than 10 BTU in/hr ft$^2$° F. onto the bond coat.

* * * * *